United States Patent [19]

Rich

[11] 4,181,554
[45] Jan. 1, 1980

[54] METHOD OF APPLYING POLARIZED FILM TO LIQUID CRYSTAL DISPLAY CELLS

[75] Inventor: Dennis E. Rich, Riverton, Utah

[73] Assignee: National Semiconductor Corporation, Santa Clara, Calif.

[21] Appl. No.: 949,192

[22] Filed: Oct. 6, 1978

[51] Int. Cl.² .............................................. B32B 31/00
[52] U.S. Cl. ..................................... 156/261; 156/518
[58] Field of Search ........................ 156/261, 262, 518

[56] References Cited

U.S. PATENT DOCUMENTS

| | | | |
|---|---|---|---|
| 2,081,716 | 5/1937 | Scholl | 156/261 |
| 3,282,762 | 11/1966 | Stork | 156/261 |
| 3,959,061 | 5/1976 | Renck | 156/262 |

*Primary Examiner*—Douglas J. Drummond
*Attorney, Agent, or Firm*—Brown & Martin

[57] ABSTRACT

In the disclosed method, a punch having a hollow open end is used to cut a portion of polarized film from a continuous sheet of polarized film. Subsequently, this portion of film is held by its perimeter while a piston that fits inside the punch and has a flexible convex shaped tip pushes the center of the portion of the held film against a liquid crystal display cell. Then the force exerted by the piston is increased. This forces the portion of film against the display cell with a rolling motion away from its center. The rolling motion eliminates the trapping of air bubbles between the portion of film and the display cell. By further increasing the force of the piston against the display cell, the flexible tip of the piston deforms in a lateral direction. Thus it completely covers the display cell, even though its undeformed cross-sectional area is less than that of the display cell.

10 Claims, 6 Drawing Figures

METHOD OF APPLYING POLARIZED FILM TO LIQUID CRYSTAL DISPLAY CELLS

BACKGROUND OF THE INVENTION

This invention relates to liquid crystal display cells, and more particularly to methods for applying a polarized film to a surface of the display cell. In the prior art, a variety of liquid crystal display cells exist. The type of display cells with which this invention is concerned includes a pair of spaced apart parallel plates having a liquid crystal material sandwiched therebetween. Transparent conductive electrodes are included on the face of the parallel plates that are in contact with the liquid crystal material. A polarized film is disposed on the other surface of either or both of these plates.

In the prior art, these polarized films were applied by hand. However, this method of fabrication is not well suited for a mass production type of operation. Application of the polarized film by hand is both too time consuming and too expensive. This is especially true in the manufacture of high volume liquid crystal devices, such as digital watches. Accordingly, it is highly desirable to devise new high speed fully automated methods for producing such devices.

A diligent search of the prior art has failed to disclose any automated methods for applying polarized film to liquid crystal display cells. The closest art found was U.S. Pat. No. 3,959,061 and U.S. Pat. No. 1,206,656. The former patent teaches a method and apparatus for inserting a membrane into a container lid, while the latter teaches a method and apparatus for manufacturing reinforced glass that consists of two glass sheets with a material such as celuloid or gelatin disposed therebetween.

Clearly, these patents are not concerned with methods of fabricating liquid crystal display cells. But U.S. Pat. No. 3,959,061 is relevant in that both it and the method disclosed herein utilize a punch with a hollow open end that contains a piston. However, the shape of the piston is U.S. Pat. No. 3,959,061 is entirely different than the shape of the piston that is used in the disclosed method. This difference is significant because in the disclosed method, the piston's shape is one of the factors that allows the polarized film to be applied to the liquid crystal display cell without trapping air bubbles therebetween.

U.S. Pat. No. 1,206,656 is relevant in that both it and the method described herein utilize a piston having a flexible convex shaped tip. However, the disclosed method further includes steps whereby the center of the portion of polarized film that is to be applied to the liquid crystal display cell is deflected away from its perimeter. This insures that the center of the portion of film is applied first to the liquid crystal display cell, and then subsequently the remainder of that portion of the film is applied to the cell with a rolling motion away from the center. This sequence of steps is essential. The polarized film is substantially thinner and less rigid than is a sheet of glass. Consequently, small wrinkles could form in the film if it were applied to the liquid crystal display cell without such deflection.

In order to implement this deflection, it is necessary that the tip of the piston have a cross-sectional area which is less than the portion of polarized film which is being deflected. Otherwise, the piston could not fit between the apparatus which holds the film's perimeter steady as its center is being deflected. Then, in order to insure that the perimeter of the film is pressed tightly against the corresponding perimeter of the display cell, it is necessary in the disclosed invention that the tip of the piston be deformable in a lateral direction to cover the cell. Neither of these requirements exist in the cited references.

Accordingly, it is one object of the invention to provide an improved method of applying polarized film to liquid crystal display cells.

Another object of the invention is to provide an automated method of applying polarized film to liquid crystal display cells without the trapping of air bubbles between the film and the cell.

SUMMARY OF THE INVENTION

These and other objects are accomplished in accordance with the invention by providing a punch with a hollow open end having a perimeter of predetermined shape with a cutting edge. A sheet of polarized film is moved under the cutting edge of the punch, and the cutting edge of the punch is moved through the sheet of polarized film to cut a portion of polarized film from the sheet. A lip extends beneath the perimeter of the portion of film, and it operates to catch and hold the portion of film by its perimeter.

A liquid crystal display cell is held on a rotatable surface in alignment with the portion of polarized film that is held by its perimeter, and a piston that has a flexible convex shaped tip substantially fills the hollow open end of the punch. This piston is moved towards the held portion of film. The convex shaped tip deflects the center of the held portion of film against the underlying liquid crystal display cell.

Subsequently, the tip of the piston is pressed against the deflected portion of the film to force it against the surface of the liquid crystal display cell with a rolling motion away from its center. This eliminates the trapping of air bubbles therebetween. By further increasing the pressure of the piston against the liquid crystal display cell, the flexible tip is deformed in a lateral direction to underlie the lip. This insures that the rolling motion extends to the perimeter of the display cell.

BRIEF DESCRIPTION OF THE DRAWINGS

The preferred steps of a process carried out according to the invention will best be understood by reference to the following detailed description when read in conjunction with the accompanying drawings wherein.

DETAILED DESCRIPTION OF THE PREFERRED EMBODIMENT

Figure 1:
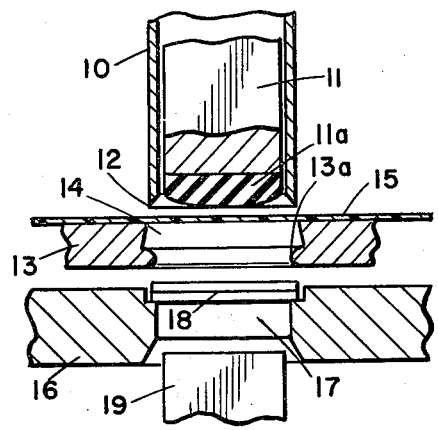
FIG. 1 illustrates one step of a process according to the invention.

The detailed steps of a process for applying polarized film to liquid crystal display cells will now be described in conjunction with FIGS. 1 through 5. In part, these steps are carried out by means of a punch 10 and a piston 11. Punch 10 has a hollow open end which is substantially filled by piston 11 and which also has a cutting edge 12. This edge is used to cut a portion of polarized film 15a that is to be applied to a liquid crystal display cell 18. Suitably, film portion 15a is rectangular. In one preferred embodiment, its dimensions are 0.400 inches by 0.800 inches.

Lying beneath punch 10 and piston 11 is a die 13. This die has an opening 14 that is aligned with and spaced apart from the perimeter of cutting edge 12. A sheet of polarized film 15 lies between edge 12 and die 13. Suitably, this sheet is supplied from a roll of film (not shown). An adhesive substance is included on the surface film 15 that faces die 13. Preferably, all of the steps described herein are carried out in an atmosphere of approximately 100° F. to 120° F. to heat and soften this adhesive.

A turn table carrier 16 lies beneath die 13. This carrier includes a plurality of notched holes 17 that are spaced apart around its perimeter. Each of the holes is shaped to hold one liquid crystal cell 18 on which the portion of the polarized film 15a is to be applied. A support platten 19 also lies beneath die 13. In operation, platten 19 is moved away from the die to allow the turn table carrier 16 to rotate and align a liquid crystal display cell 18 with die 13. Subsequently, platten 19 is inserted into the hole 17 that holds the aligned cell to provide support for the bottom of that cell.

Figure 2:
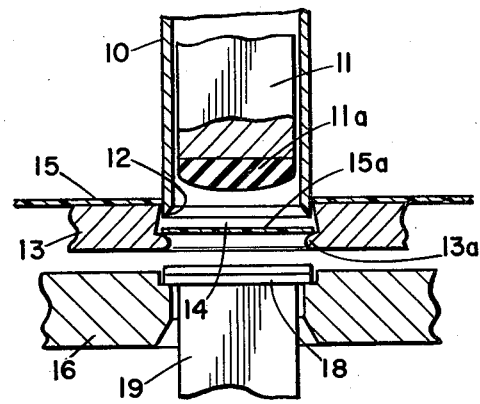
FIG. 2 illustrates another step of the same process.

An initial step of the disclosed process consists of moving sheet 15 between punch 10 and die 13 until portion 15a of the sheet 15 lies therebetween. This is illustrated in FIG. 1. Subsequently, cutting edge 12 of punch 10 is moved through sheet 15 as illustrated in FIG. 2. A lip 13a protrudes from die 13 into opening 14. This lip catches and holds the portion of film 15a by its perimeter.

Figure 3:
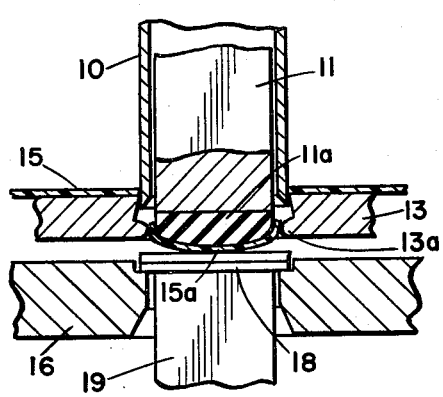
FIG. 3 illustrates another step of the same process.

Subsequently, piston 11 is moved towards film portion 15a. This piston has a convex shaped flexible tip 11a. Suitably, tip 11a is comprised of a silicone rubber. As FIG. 3 illustrates, the movement of piston 11 causes the center of film portion 15a to be deflected against the center of liquid crystal display cell 18. That is, the convex shape of tip 11a pushes the center of film portion 15a against display cell 18, while simultaneously lip 13a holds the pe perimeter of film portion 15a away from display cell 18.

Figure 4:
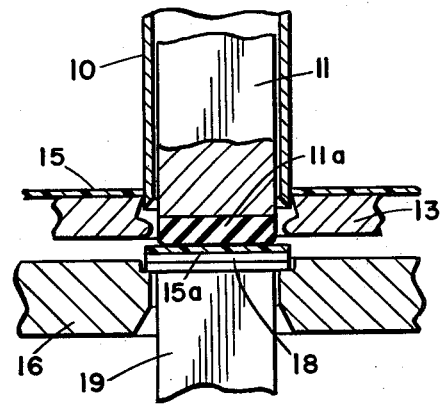
FIG. 4 illustrates another step of the same process.

Next, the force with which tip 11a is pushed against film portion 15a is increased. As a result, tip 11a begins to flatten against film portion 15a. This is illustrated in FIG. 4. The flattening produces a rolling motion away from the center of film portion 15a and towards its perimeter. And this motion eliminates the trapping of air bubbles between film portion 15a and display cell 18.

Figure 5:
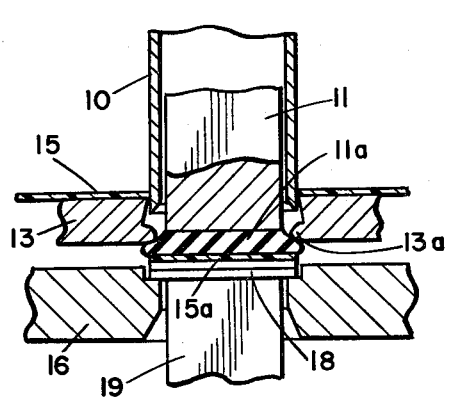
FIG. 5 illustrates still another step of the same process.

As the force exerted by piston 11 is further increased, tip 11a deforms such that it completely covers film portion 15a and cell 18. That is, tip 11a deforms in a lateral direction to underlie lip 13a. Consequently, the perimeter of display cell 18 and film portion 15a are pressed tightly together, even though they underlie lip 13a. This step of the process is illustrated in FIG. 5.

Subsequently, punch 10 and piston 11 are withdrawn from hole 14. Also, platten 19 is withdrawn from hole 17. Then the steps of FIGS. 1 through 5 are repeated to apply a portion of polarizing film to another crystal display cell. Typically, the entire sequence of steps takes approximately 3 seconds.

Figure 6:
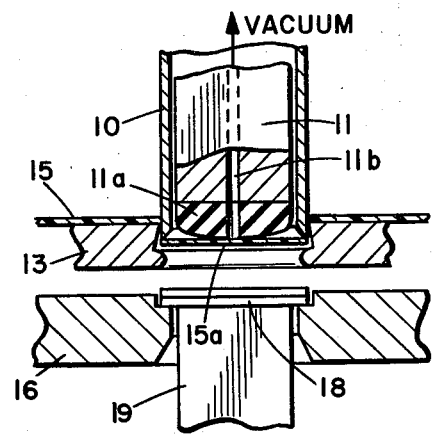
FIG. 6 illustrates an alternative step in a modification of the process of FIGS. 1 through 5.

A modification of the above described process will now be described in conjunction with FIG. 6. This process uses apparatus similar to that described above, and like parts have like reference numerals. The major difference in the FIG. 6 process is that piston 11 includes a hole 11b which extends through tip 11a. In operation, a vacuum is created in hole 11b by suitable means attached to the end of piston 11 (not shown). This vacuum holds the portion of film 15a against tip 11a as it is cut from sheet 15. Recall that the previously described process utilized lip 13a to catch the portion of film 15a as it was cut. Lip 13a is still utilized, however, in this alternative process. It deflects the portion of film 15a as it is being applied to the underlying liquid crystal display cell 18, as illustrated in FIGS. 3 and 4.

Various steps for applying a portion of polarized film to a liquid crystal display cell have now been described in detail. In addition, many changes and modifications may be made to these steps without departing from the nature and spirit of the invention. Therefore, it is to be understood that the invention is not limited to said details but is defined in the appended claims.

I claim:

1. A method for applying a portion of polarized film to a surface of a liquid crystal display cell including the steps of:

provoding a punch with a hollow open end having a perimeter of a predetermined shape with a cutting edge, and a die having an opening of said predetermined shape aligned with and spaced apart from said cutting edge;

moving a sheet of polarized film between said cutting edge of said punch and said opening of said die with said film having an adhesive surface facing said die;

moving said cutting edge of said punch through said sheet of polarized film into said opening of said die to cut said portion of polarized film from said sheet;

catching and holding said portion of film by the perimeter thereof;

holding said liquid crystal cell with said surface lying directly beneath said held portion of polarized film;

moving a piston, that substantially fills said hollow open end of said punch and that has a flexible convex shaped tip, toward said held portion of film to deflect the center of said held portion of film against said surface; and pressing said flexible tip against said deflected portion of film to force said portion against said surface with a rolling motion away from said center thereby eliminating the trapping of air bubbles between said portion of film and said surface.

2. A method according to claim 1, wherein all of said steps are performed in an atmosphere substantially above room temperature to soften said adhesive.

3. A method according to claim 1, wherein said catching and holding step is performed by a lip protruding from the perimeter of said die opening.

4. A method according to claim 1, wherein said holding of said liquid crystal cell is performed by:

providing a turn table carrier having a rotatable surface with a plurality of notched holes, for holding respective liquid crystal cells, spaced apart around the perimeter of said rotatable surface;

inserting one liquid crystal cell into each of said holes;

rotating said rotatable surface to align one of said liquid crystal cells with said held portion of film; and inserting a support platten into said hole beneath said one aligned liquid crystal cell.

5. A method according to claim 1, wherein said predetermined shape is rectangular and wherein said flexible tip is of a planar convex shape.

6. A method for applying a portion of polarized film to a surface of a liquid crystal display cell including the steps of:
- providing a punch with a hollow open end having a perimeter of a predetermined shape with a cutting edge, and a die having an opening of said predetermined shape aligned with and spaced apart from said cutting edge;
- moving a sheet of polarized film between said cutting edge of said punch and said opening of said die with said film having an adhesive surface facing said die;
- moving said cutting edge through said sheet of polarized film into said opening of said die to cut said portion of polarized film from said sheet;
- providing a piston, that substantially fills said hollow open end of said punch and that has a flexible convex shaped tip with a hole running thereto for holding said portion of film on said tip by application of a vacuum to said hole;
- holding said liquid crystal cell with said surface lying directly beneath said held portion of polarized film;
- moving said piston toward said liquid crystal cell while simultaneously holding still the perimeter of said portion of film to thereby deflect the center of said portion of film against said liquid crystal cell; and
- pressing said flexible tip against said deflected portion of film to force said portion against said surface with a rolling motion away from said center thereby eliminating the trapping of air bubbles between said portion of film and said surface.

7. A method according to claim 6, wherein all of said steps are performed in an atmosphere substantially above room temperature to soften said adhesive.

8. A method according to claim 6, wherein said holding of the perimeter of said portion of film is performed by providing, on said die, a lip extending beneath said perimeter of said opening.

9. A method according to claim 6, wherein said holding of said liquid crystal cell step is performed by:
- providing a turn table carrier having a rotatable surface with a plurality of notched holes of the shape of said liquid crystal cell spaced apart around the perimeter of said rotatable surface;
- inserting one liquid crystal cell into each of said notched holes;
- rotating said rotatable surface to align one of said liquid crystal cells with said held portion of film, and
- inserting a support platten into said notched hole beneath said one aligned liquid crystal cell.

10. A method according to claim 6, wherein said predetermined shape is rectangular and wherein said flexible tip has a cylindrical convex shape.

* * * * *